United States Patent
Tov

(10) Patent No.: US 11,178,518 B1
(45) Date of Patent: Nov. 16, 2021

(54) SYSTEM AND METHOD FOR MESSAGE ACKNOWLEDGEMENT WHEN MESSAGING SYSTEM IS UNAVAILABLE

(71) Applicant: MOTOROLA SOLUTIONS, INC., Chicago, IL (US)

(72) Inventor: Jacob Shem Tov, Jerusalem (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/092,526

(22) Filed: Nov. 9, 2020

(51) Int. Cl.
| | |
|---|---|
| H04W 4/08 | (2009.01) |
| H04W 4/90 | (2018.01) |
| H04W 4/12 | (2009.01) |
| H04L 12/58 | (2006.01) |
| H04W 4/10 | (2009.01) |
| H04W 84/04 | (2009.01) |

(52) U.S. Cl.
CPC .............. *H04W 4/08* (2013.01); *H04L 51/30* (2013.01); *H04W 4/10* (2013.01); *H04W 4/12* (2013.01); *H04W 4/90* (2018.02); *H04W 84/042* (2013.01)

(58) Field of Classification Search
CPC ........... H04W 4/08; H04W 4/12; H04W 4/90; H04W 4/10; H04W 76/45; H04W 12/76; H04W 84/08; H04W 84/042
See application file for complete search history.

(56) References Cited

U.S. PATENT DOCUMENTS

| | | | |
|---|---|---|---|
| 8,369,882 B1 | 2/2013 | Manroa et al. | |
| 9,654,257 B2 | 5/2017 | Bohn | |
| 10,216,185 B2 | 2/2019 | Kotlyarov | |
| 2007/0133435 A1* | 6/2007 | Eneroth | .................. H04W 4/10 370/260 |

FOREIGN PATENT DOCUMENTS

| | | |
|---|---|---|
| WO | 2014062928 A1 | 4/2014 |
| WO | 2015057097 A1 | 4/2015 |

OTHER PUBLICATIONS

Zakaria, Oren, et al.: "Methods and Apparatus for Detecting Faults in a Siren-Based Alert System Background of the Invention", U.S. Appl. No. 16/567,685, filed Sep. 11, 2019, all pages.
Phu, Jin Hoe, et al.: "Failure Management in Push To Talk for the Internet of Things", U.S. Appl. No. 16/665,873, filed Oct. 28, 2019, all pages.

* cited by examiner

*Primary Examiner* — Keith Ferguson

(57) ABSTRACT

Techniques for message acknowledgement when messaging system is unavailable are provided. A controller may receive a group text including a message that requires acknowledgement. The group text is directed to at least one controller. A message identification may be extracted from the message. The message identification may be associated with the message that requires acknowledgement. A talkgroup identifier may be computed based in part on the message identification. A radio associated with the controller may join a talkgroup that is associated with the talkgroup identifier. A floor control request may be sent via the radio on the talkgroup associated with the talkgroup identifier. The floor control request may serve as an acknowledgement of receipt of the message.

20 Claims, 7 Drawing Sheets

SYSTEM AND METHOD FOR MESSAGE ACKNOWLEDGEMENT WHEN MESSAGING SYSTEM IS UNAVAILABLE

BACKGROUND

Mission critical communications describes communications systems that must remain available, regardless of circumstances. One such example is a siren alerting system that may be used to alert the public to impending dangers, either natural (e.g. tornado, flash flood, etc.) or manmade (e.g. air raid, etc.). In general, a siren alerting system may include a siren control center, which determines when the siren should be activated and one or more remote locations, distributed throughout the geographic region covered by the siren control center. When instructed by the siren control center, the remote locations may activate their sirens, thus informing the public of an impending emergency. In some cases, the siren can also convey a speech message (e.g. giant voice) as opposed to just a siren.

Because these mission critical systems are most important in times of emergency, they are designed to operate regardless of conditions. For example, the systems may include generators to protect against loss of power supplied by the power grid. Communication between the siren control center and the remote locations may be wireless to prevent disruption caused by downed telephone lines. The wireless communications may themselves be provided by mission critical systems, such as those provided by Project 25 (P25) Land Mobile Radio Systems (LMR) or Terrestrial Trunked Radio (TETRA) systems.

To further ensure reliable communications, the same message (e.g. siren activation message, etc.) may be sent over multiple communications paths. For example, in an LMR system, a message may be sent to the siren controllers as an individual message via the LMR data system. The message may also be sent to a group of one or more controllers as a group message that is transmitted over the LMR voice system. The messages may include the same message identifier. The controller may receive the first to arrive message and act on it. The second to arrive message, which has the same message identifier as the first to arrive message, can then be discarded as a duplicate message. This helps to ensure reliable communications because if one communication path is unavailable, the message may still be received via the other communications path.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments

Figure 1:
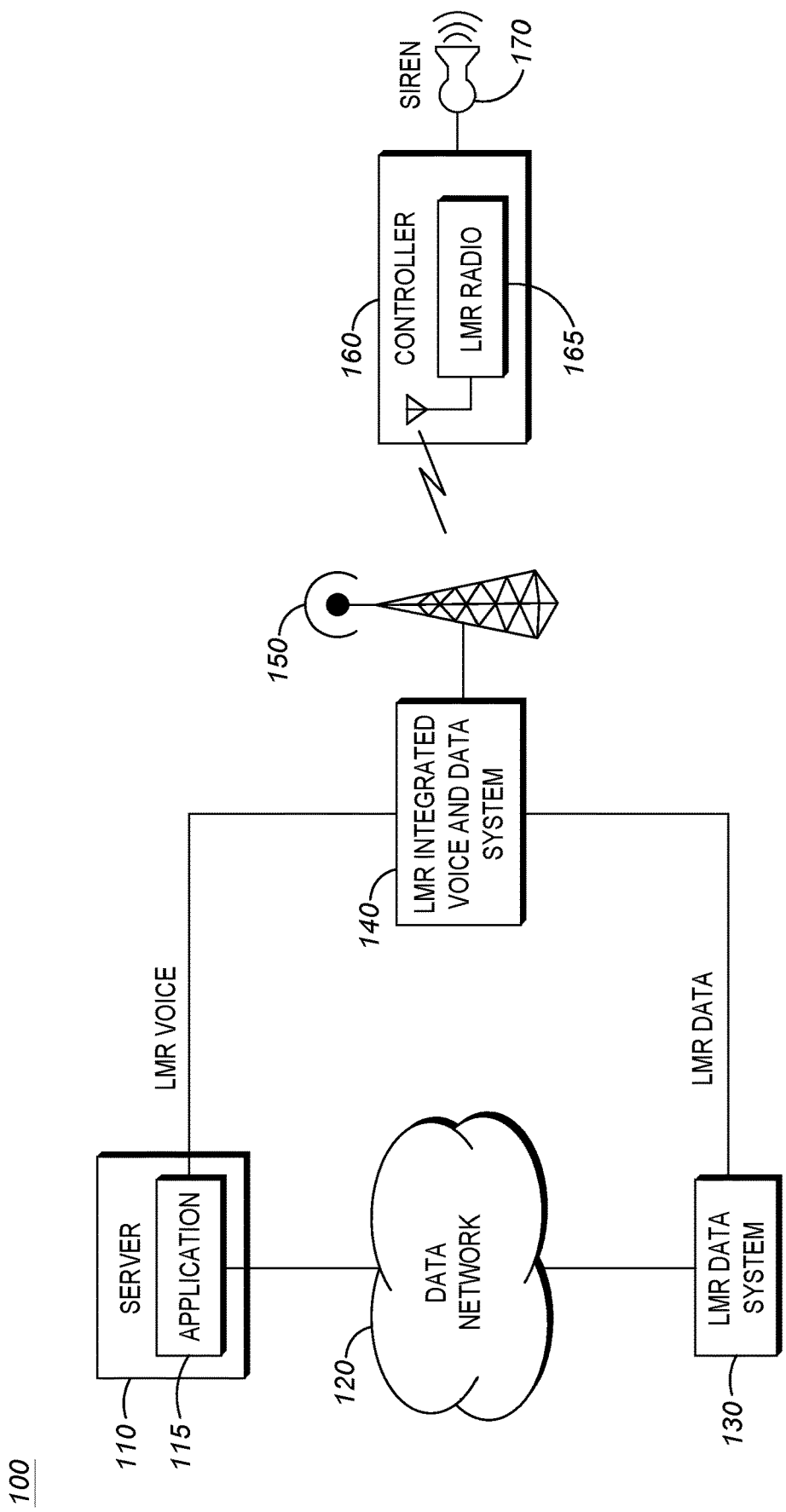
FIG. 1 is a block diagram of an example system that may implement message acknowledgement when messaging system is unavailable techniques described herein.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

The use of two communications paths provides for redundancy, such that if one path fails, the other may still be available. A problem arises with respect to acknowledging the receipt of the message. Mission critical system cannot operate under a best effort paradigm. For example, in a siren application, if the siren is commanded to activate, it must be confirmed that the siren did, in fact, activate, as a failure to activate could have dire consequences (e.g. injury/loss of life due to people not seeking shelter when the siren sounds). The message to activate the siren may need to be sent over and over until an acknowledgement is received that the message was received and acted upon.

The problem that arises is that although the message can be sent to the remote site over both the LMR voice system and the LMR data system, return messages can only be sent over the LMR data system. If the LMR data system is unavailable, messaging from the remote site to the controller will be unavailable. As such, even if the message gets through to the remote site via group text over the LMR voice system, the remote site has no way of acknowledging the message via the LMR data system.

The techniques described herein overcome this problem by utilizing the LMR voice system. The remote site includes an LMR radio associated with an identifier. The remote site controller may extract the message identifier from the received group text message. The remote site controller may then compute a talkgroup identifier based on the LMR radio identifier and/or the message identifier. The remote site controller may then send a floor control request via the Push-to-Talk (PTT) function of the LMR radio on the computed talkgroup identifier. The floor control request on the talkgroup will include the identifier associated with the LMR radio.

The control center may also compute a talkgroup identifier based on the LMR radio identifier and/or the message identifier. The controller may then periodically query the LMR voice system to determine if a floor control request has been received from the LMR radio associated with the LMR radio identifier on the computed talkgroup. If so, this can be considered an acknowledgement of the message that included the message ID. Furthermore, because the message identifier is included in the computation of the talkgroup, an individual message can be acknowledged. This is unlike other PTT to acknowledge systems in which a floor control request can be associated with a general acknowledgement, but cannot be associated with acknowledgement of a specific message.

A method is provided. The method includes receiving, at a controller, a group text including a message that requires acknowledgement, wherein the group text is directed to at least one controller. The method further includes extracting a message identification from the message, the message identification associated with the message that requires acknowledgement. The method additionally includes computing a talkgroup identifier based in part on the message identification. The method also includes joining, by a radio associated with the controller, a talkgroup associated with the talkgroup identifier. The method additionally includes sending a floor control request via the radio on the talkgroup associated with the talkgroup identifier, wherein the floor control request serves as an acknowledgement of receipt of the message.

In one aspect, computing the talkgroup identifier further comprises computing the talkgroup identifier further based in part on the controller identification. In one aspect, the controller is a siren controller and the message requiring acknowledgement is a siren activation command. In one aspect, the talkgroup identifier is computed using a modulo operator.

In one aspect, the method further comprises monitoring, by a server, the floor control request for the talkgroup associated with the talkgroup identifier, extracting a radio identifier of the radio that sent the floor control request, wherein the radio identifier is associated with the controller, and determining that the controller associated with the radio identifier has acknowledged the message that required acknowledgement.

In one aspect, the method further comprises resending the group text to at least one controller that has been determined to not have acknowledged the message that required acknowledgement. In one aspect, the floor control request is a push to talk (PTT) request on a land mobile radio (LMR) network.

A system is provided. The system includes a processor and a memory coupled to the processor. The memory contains a set of instructions thereon that when executed by the processor cause the processor to receive, at a controller, a group text including a message that requires acknowledgement, wherein the group text is directed to at least one controller. The instructions further cause the processor to extract a message identification from the message, the message identification associated with the message that requires acknowledgement. The instructions also cause the processor to compute a talkgroup identifier based in part on the message identification. The instructions additionally cause the processor to join, by a radio associated with the controller, a talkgroup associated with the talkgroup identifier. The instructions also cause the processor to send a floor control request via the radio on the talkgroup associated with the talkgroup identifier, wherein the floor control request serves as an acknowledgement of receipt of the message.

In one aspect, computing the talkgroup identifier further comprises instructions to compute the talkgroup identifier further based in part on the controller identification. In one aspect, the controller is a siren controller and the message requiring acknowledgement is a siren activation command. In one aspect, the talkgroup identifier is computed using a modulo operator.

In one aspect, the system further comprises instructions to monitor, by a server, the floor control request for the talkgroup associated with the talkgroup identifier, extract a radio identifier of the radio that sent the floor control request, wherein the radio identifier is associated with the controller, and determine that the controller associated with the radio identifier has acknowledged the message that required acknowledgement.

In one aspect, the system further comprises instructions to resend the group text to at least one controller that has been determined to not have acknowledged the message that required acknowledgement. In one aspect, the floor control request is a push to talk (PTT) request on a land mobile radio (LMR) network.

A non-transitory processor readable medium containing a set of instructions thereon is provided. The medium contains a set of instructions thereon that when executed by a processor cause the processor to receive, at a controller, a group text including a message that requires acknowledgement, wherein the group text is directed to at least one controller. The instructions further cause the processor to extract a message identification from the message, the message identification associated with the message that requires acknowledgement. The instructions also cause the processor to compute a talkgroup identifier based in part on the message identification. The instructions additionally cause the processor to join, by a radio associated with the controller, a talkgroup associated with the talkgroup identifier. The instructions also cause the processor to send a floor control request via the radio on the talkgroup associated with the talkgroup identifier, wherein the floor control request serves as an acknowledgement of receipt of the message.

In one aspect, computing the talkgroup identifier further comprises instructions to compute the talkgroup identifier further based in part on the controller identification. In one aspect, the controller is a siren controller and the message requiring acknowledgement is a siren activation command. In one aspect, the talkgroup identifier is computed using a modulo operator.

In one aspect, the medium further comprises instructions to monitor, by a server, the floor control request for the talkgroup associated with the talkgroup identifier, extract a radio identifier of the radio that sent the floor control request, wherein the radio identifier is associated with the controller, and determine that the controller associated with the radio identifier has acknowledged the message that required acknowledgement.

In one aspect, the medium further comprises instructions to resend the group text to at least one controller that has been determined to not have acknowledged the message that required acknowledgement. In one aspect, the floor control request is a push to talk (PTT) request on a land mobile radio (LMR) network.

Further advantages and features consistent with this disclosure will be set forth in the following detailed description, with reference to the figures.

FIG. 1 is a block diagram of an example system that may implement message acknowledgement when messaging system is unavailable techniques described herein. System 100 may include server 110, data network 120, LMR data system 130, LMR integrated voice and data system 140, base station 150, and controller 160. Server 110 may be any type of computing device that is capable of running an application 115 that sends messages to remote sites via a LMR radio channel and requires acknowledgement of receipt of those messages by the remote sites. As explained above, a siren control system is one example of such an application. However, it should be understood that the techniques described herein are applicable with any application that sends messages to a remote site and requires acknowledgement of the receipt of those messages.

Data network 120 represents any data network that may be used to communicate data. Most commonly, the data network will be an Internet Protocol (IP) network such as an intranet or the Internet, but the techniques described herein are not dependent on any particular data protocol. The application 115, through server 110, may communicate to external entities through data network 120.

One example of such an external entity is LMR data system 130. The LMR data system 130 may act as a gateway between the protocol used by the data network (e.g. IP, etc.) and the LMR integrated voice and data system 140. The LMR data system allows for two-way data communications between the application 115 and the controller 160. Although described as the LMR data system, it should be understood that this is for ease of description. The data system could be associated with any other type of radio protocol (e.g. TETRA, etc.). What should be understood is that the data system 130 allows for two-way data communications with controller.

The LMR integrated voice and data system 140 allows for data communications between the application 115 and the controller. Data received from the application 115 is converted to the LMR protocol via the LMR data system 130. The LMR data system then passes the data to the LMR integrated voice and data system 140 which processes the data such that it can be sent via radio over the air via base station 150 in accordance with the LMR data protocol.

The LMR integrated voice and data system 140 also provides for voice communications. In typical operation, a communication device that wishes to use LMR voice communications will send a floor control request (e.g. request to transmit). The floor control request may include an identifier associated with the transmitting radio (e.g. base station 150, LMR radio 165, etc.). The floor control request may also include a talkgroup identifier. The talkgroup is basically a channel identifier that specifies the other users that are to receive the communication.

For example, consider an LMR system that supports both a police department and a fire department. Each of those departments may be associated with a unique talkgroup. When a fireman requests communications (e.g. presses the PTT button on his radio to request the floor), the request will include the talkgroup identifier of the fire department. After receiving permission to speak (e.g. talk permit tone, chirp, etc.) from the LMR integrated voice and data system 140, the fireman begins to speak.

For ease of description, and as would be known to one of skill in the art, receiving permission to speak (e.g. floor grant) may involve several steps, such as finding an available frequency (in a trunked system) and ensuring the frequency is not currently in use (e.g. channel busy), etc. Once the communications channel is set up, the fireman may begin to speak and the LMR integrated voice and data system 140 will receive the communication and rebroadcast it to all radios, the rebroadcast including the talkgroup identifier. All radios (e.g. both fire and police department) are capable of receiving the transmission. However only those radios in the same talkgroup will unmute and play out the speech. In other words, when the fireman speaks, only other people in the fire department talkgroup will hear what he is saying.

The current P25 specification provides for 16 bits to store the talkgroup identifier. Use of a 16-bit identifier means that there are a total of 65,536 available talkgroup identifiers. The large number of talkgroup identifiers may be useful in preventing collisions, as will be described in further detail below.

Controller 160 may be any type of computing system that is capable of receiving messages from LMR base station 150. For example, controller 160 may be integrated with or coupled to LMR radio 165. An example controller 160 is described with respect to FIG. 6. LMR radio 165 may allow controller 165 to receive and send data messages to the application 115 via the LMR data system 130. LMR radio 165 may allow the controller to receive group messages from the application via the LMR voice system, although this is a one-way communication. There is no equivalent of sending a data message from the LMR radio to the application via the LMR voice system. LMR radio 165 also allows for voice communication (e.g. PTT floor control requests) to the LMR voice system.

Controller 160 may also include siren 170. As explained above, in a siren alerting system, the purpose of the system may be to activate and deactivate the siren. However, it should be understood that the siren alerting system is only one example, application and is provided for ease of description only. In actuality, the controller may be utilized in any number of other applications (e.g. wastewater management, remote data acquisition, oil and natural gas field monitoring, etc.).

It is possible that the LMR data system 130 becomes unavailable for any number of reasons. For example, the link between the server 110 and the data network 120 may become inoperable. Likewise, the data network 120 may experience a fault. The link between the data network 120 and the LMR data system 130 may fail. The LMR data system itself may fail. As yet another example, the link between the LMR data system and the LMR integrated voice and data system 140 may fail. Regardless of where the failure occurs, the LMR data system may become unavailable. As such even if the LMR radio 165 receives a group message over the LMR voice system, there is no way for the LMR radio to acknowledge the receipt, because there is no reverse message in the LMR voice system.

The LMR voice system may generally be more robust than the LMR data system and may be available even when there is a failure in the LMR data system. Thus, the LMR radio may still be able to use the LMR voice system to send a floor control request for a talkgroup. The talkgroup identifier may be computed based on the identifier associated with the LMR radio 165 as well as a message identifier included in the message sent to the LMR radio. Sending a floor control request for the computed talkgroup identifier may be used to serve as an acknowledgement of a specific message as will be described in further detail with respect to FIG. 3.

Figure 2A:
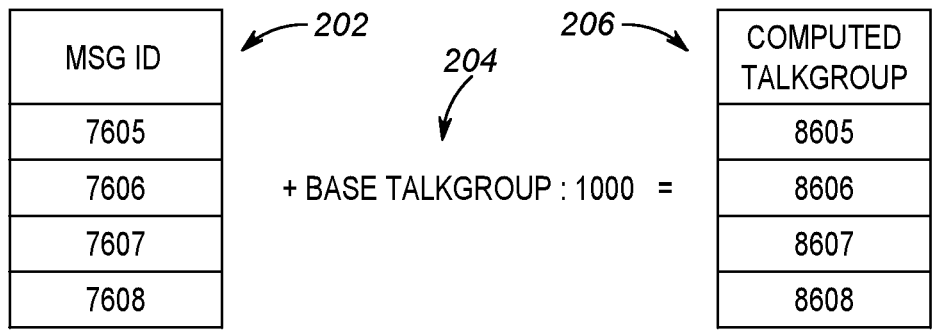
FIGS. 2(A-C) are examples of techniques that may be used to compute a talkgroup identifier based on a site controller identifier and/or a message identifier.

FIGS. 2(A-C) are examples of techniques that may be used to compute a talkgroup identifier based on a site controller identifier and/or a message identifier. For purposes of the examples, assume that each subsequently sent message has an identifier that is one greater than the previous message. Use of the computed talkgroup identifier will be described in further detail with respect to FIG. 3. In the simplest example the computation of the talkgroup identifier may be no computation at all. For example, the message identifier may simply be used as the talkgroup identifier. In FIG. 2A, an example set of message identifiers 202 is shown. The message identifiers may then be simply substituted for the talkgroup identifier. For example, an acknowledgement for message identifier 7606 may be sent on talkgroup 7606.

As another example, continuing with FIG. 2A, a talkgroup identifier may be computed by adding a base talkgroup 204 to the message identifier. As shown in FIG. 2A, the computed talkgroup identifier 206 is simply the message identifier plus the base talkgroup (e.g. 1000, etc.).

Figure 2B:
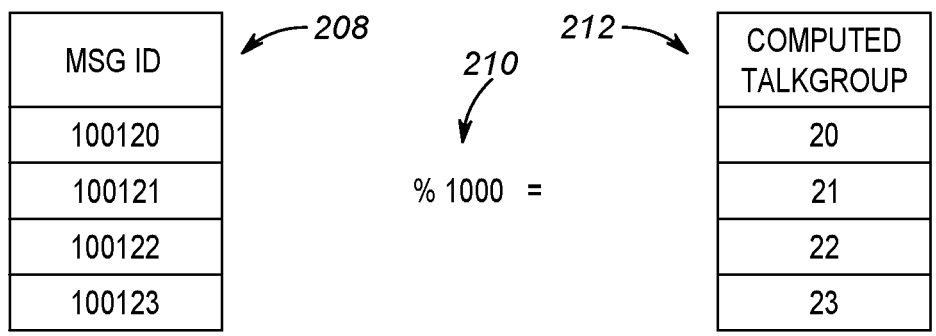

A problem may arise when the message identifiers are greater in magnitude than the available talkgroups. For example, as shown in FIG. 2B, message identifiers 208 are larger than the 65,536 available talkgroups. In order to restrict the computed talkgroups to a defined set of talkgroups, a modulo operation may be performed. For example, performing a modulus 100 operation 210 on the message identifiers, the resultant computed talkgroup identifier will fall within the range of 0 to 99 as shown in list 212. Although such an operation does risk multiple message identifiers computing to the same talkgroup (e.g. message identifier #10001 and #20001 will result in the same computed talkgroup, e.g. 1), such risk can be mitigated by setting the mod value high enough that such a collision is unlikely.

Figure 2C:
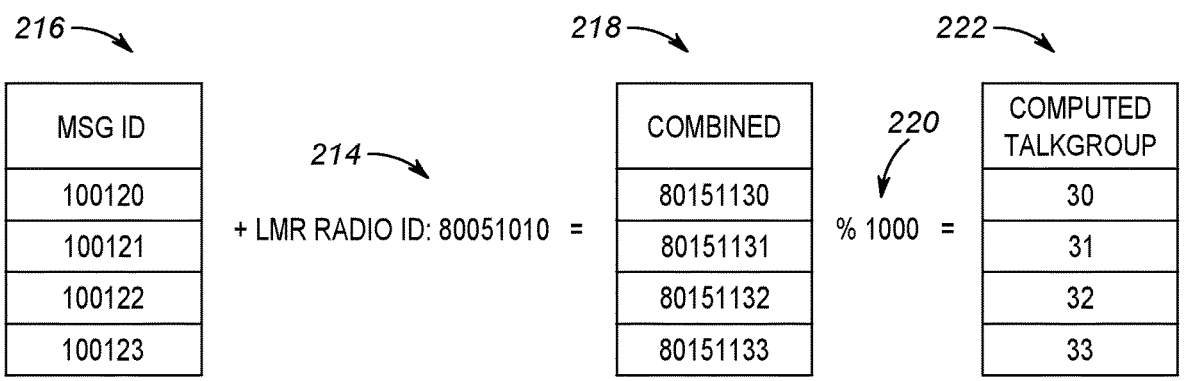

FIG. 2C is an example of computing the talkgroup identifier based on the LMR radio identifier 214 as well as the message identifier 216. The two may be combined, for example, using a simple addition operation resulting in combined identifiers 218. A modulo operation 220 may be performed to cause the resulting computed talkgroup identifications 222. It should be noted that although the original message identifications in FIGS. 2B and 2C are the same, the resultant computed talkgroup identifiers 212, 222 are different because of the introduction of the LMR radio identifier component. Also, although not shown, as each LMR radio would have a different identifier, the computed talkgroup 222 for each LMR radio may be different.

Although several examples of computing talkgroup identifiers have been presented, the techniques described herein are not so limited. What should be understood is that any algorithm may be used that allows both the application 115 and the controller 160 to compute the same, valid talkgroup identifier when given the same inputs (e.g. message identifier and LMR radio identifier). The algorithm should be designed such that the risk of collision of computed talkgroup identifiers is minimized based on the number of messages expected to be sent within a reasonable time period.

Figure 3:
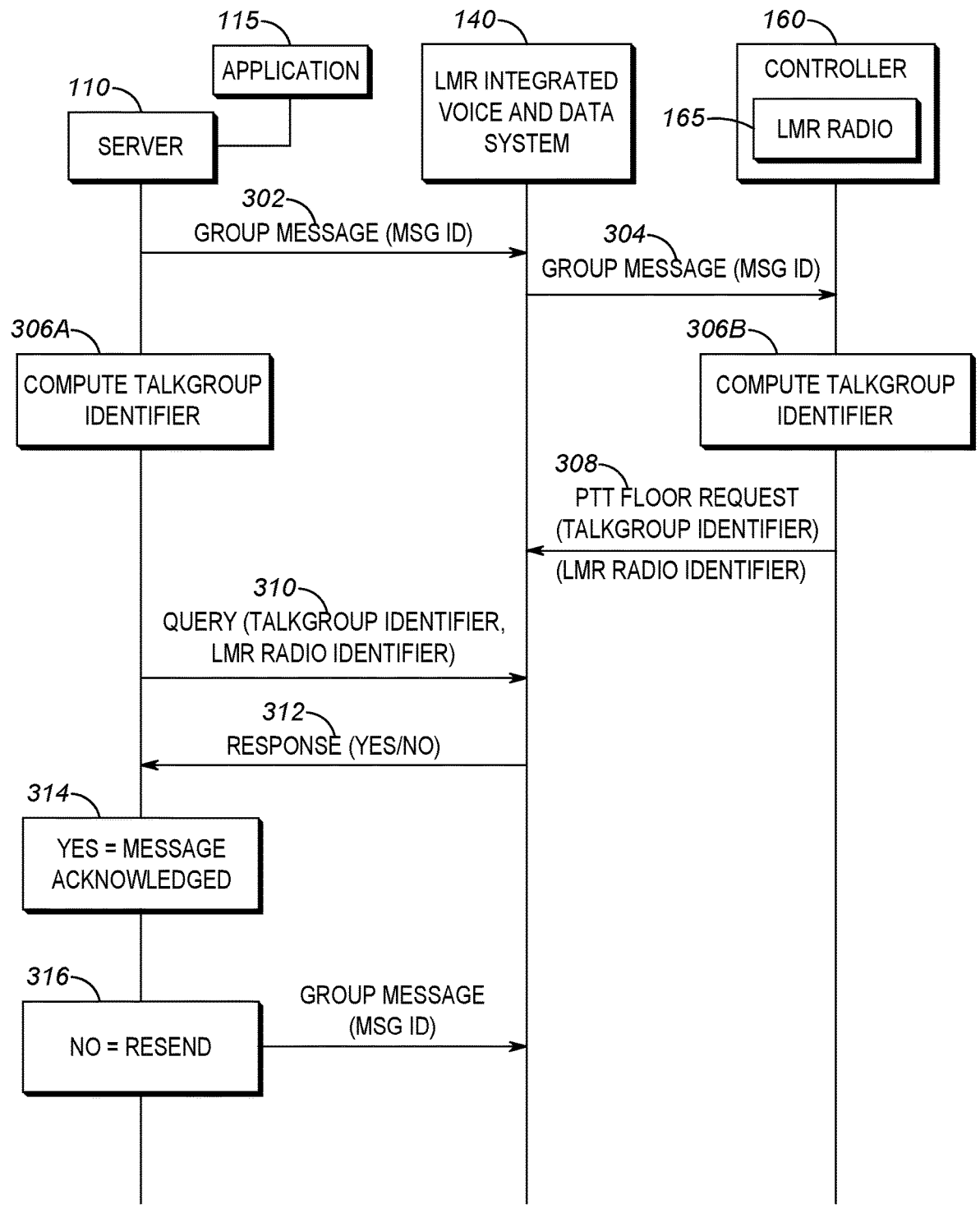
FIG. 3 is an example of a sequence diagram for sending a message and receiving an acknowledgement message when messaging system is unavailable according to the techniques described herein.

FIG. 3 is an example of a sequence diagram for sending a message and receiving an acknowledgement message when messaging system is unavailable according to the techniques described herein. For purposes of the description of FIG. 3, assume that the LMR data system 130 is, for some reason, unavailable. As such, messages that are to be sent to the controller 160 are sent via the LMR voice system via the LMR integrated voice and data system 140 in a one-way communication. There is no ability for the controller 160 to respond to the message via a messaging system.

Initially, an application 115 running on a server 110 may desire to send a message to one or more controllers 160. For example, in the case of a siren alerting system, the message may include a command to activate a siren. However, it should be understood that the techniques described herein are not limited to any particular application. For example, in a wastewater treatment plant, the message could include an instruction to take a water level measurement or turn on a pump. In other applications the message could include other information. What should be understood is that the application 115 desires to send a message to the controller 160, and that message requires acknowledgement of receipt.

The application 115, via the server 110 may send a group message 302 that includes a message identifier (MSG ID). The message identifier may be an identifier that is uniquely associated with this message. As a simple example, the message identifier could be a numeric value that is incremented by one for each subsequent message. The group message may be directed to one or more controllers, such as controller 160. As explained above, the group message may be a broadcast message. There is no ability for a controller to respond to the message because the messaging system provided by the LMR data system 130 is unavailable.

The LMR integrated voice and data system 140 may send the group message 304 to controller 160 via the radio air interface (not shown). The message may be sent as a group message that is directed to one or more controllers. The controller 160 may receive the group message via its communicatively coupled LMR radio 165.

At this point, the controller 160 may execute any instructions/command/measurement/etc. specified in the group message. As mentioned above, in a siren system, the message may include a command to activate the siren. In other applications, the message may include instructions to perform some other action. The techniques described herein are independent of whatever action is specified in the message. What should be understood is that once the group message is received, it needs to be acknowledged.

At 306A and 306B, a talkgroup identifier may be computed. The computation may be based on the message identifier included in the group message and/or an identifier associated with the LMR radio 165. Several examples of computation of the talkgroup identifier are provided with respect to FIGS. 2(A-C). What should be understood is that both the application 115 and controller 160 compute the talkgroup identifier using the same algorithm using the same inputs. Thus, the computed talkgroup identifier at both the application 115 and the controller 160 are the same.

At 308 the LMR radio 165 may send a PTT floor request message to the LMR integrated voice and data system. The floor request includes the talkgroup identifier computed in 306B as well as the identifier associated with LMR radio 165. In a regular voice call, a floor request would be a request for the LMR radio to begin transmitting audio. In a normal voice call, the request could either be granted or denied by the LMR integrated voice and data system 140. As will become clear further below, whether the floor control request is granted or denied is irrelevant with respect to the techniques described herein.

In query message 310, the application 115 may query the LMR integrated voice and data system 140 to determine if a floor request has been received from the LMR radio 165 that is associated with controller 160 on the talkgroup that was computed in 306A. The LMR integrated voice and data system provides a response 312 indicating if a floor control request on the computed talkgroup was sent by LMR radio 165. If yes, 314 this is an indication that the controller 160 has acknowledged the message.

If not, 316, the message may be resent. In some implementations, the message may only be resent to those controllers that did not acknowledge the message, while in other cases, the message is resent to all controllers, and those controllers who have already acted on the message may discard the message as a duplicate. In some implementations, the server may periodically query the LMR integrated voice and data system 140 several times before determining that no acknowledgement was received and resending the message.

In yet other implementations (not shown), instead of querying the LMR integrated voice and data system 140, the application 115 may request that the LMR integrated voice and data system provide a notification when a given LMR radio 165 sends a floor request on the computed talkgroup. If so notified, this indicates an acknowledgment of the message. If no such notification is received after a defined period time, this indicates the message has not been acknowledged. The message may be resent.

It should be understood that it does not matter if the floor request is granted or rejected, simply that it was received. In some implementations the LMR integrated voice and data system 140 may always deny the floor request, because LMR radio 165 does not have any actual voice traffic to transmit. The fact that the floor request was received is sufficient for purposes of the techniques described herein. Furthermore, because LMR radio 165 will not actually use voice resources, computed talkgroups that happen to collide with other active voice talkgroups are acceptable, because they will not actually take away voice resources from those talkgroups.

It should be further understood that the inclusion of the message identifier as an input to the computation of the talkgroup is important to distinguish which message identifier is being acknowledged. Consider a case where there are three messages sent. For this example, assume that the system is a siren control system, and the messages sent are 1. Siren On followed by 2. Siren Off followed by 3. Siren On. Because each of these messages would have a different message identifier, the computed talkgroup for each message would be different, which in turn means that it could be determined which message is being acknowledged.

Contrast that with a system that uses a simple PTT on a fixed talkgroup as a mechanism for acknowledgement. Consider a case where the three messages (Siren On—Siren Off—Siren On) sequence is sent, but only two acknowledgements via PTT are received. It is impossible to determine the current state of the siren definitively. If the first siren on message was lost, the acknowledgements would be for siren off then siren on, meaning the siren would currently be on. However, if the second siren on message were lost, the two acknowledgements would be for the first siren on and the siren off messages, meaning the siren would currently be off. The techniques described herein allow for each message to map to a different talkgroup, so the acknowledgment on a specific talkgroup signifies an acknowledgement of the specific message that maps to that computed talkgroup.

Figure 4:
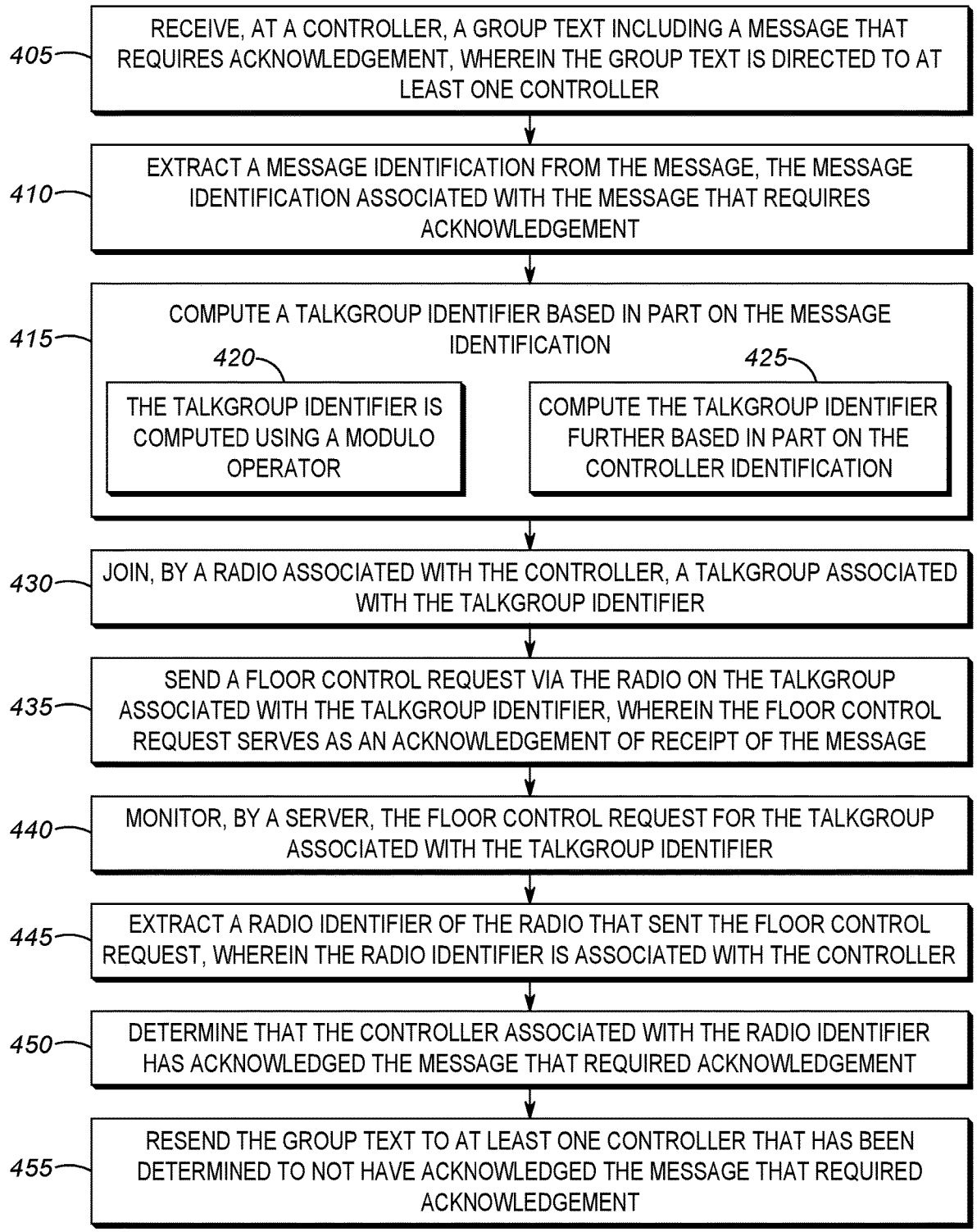
FIG. 4 is an example of a flow diagram for implementing the message acknowledgement when messaging system is unavailable techniques described herein.

FIG. 4 is an example of a flow diagram 400 for implementing the message acknowledgement when messaging system is unavailable techniques described herein. In block 405, a group text including a message that requires acknowledgement may be received. The group text is directed to at least one controller. In other words, the group text message is sent from the application to one or more controllers as a group message. As mentioned above, the group message may be sent as a message over the LMR voice system and there is no ability for the controller to respond with a voice message over the LMR voice system, as messaging on the LMR voice system is one way broadcast only.

In block 410, a message identification may be extracted from the message. The message identification may be associated with the message that requires acknowledgement. Each message sent to the controller may have a unique message identification. This unique message identification may be used to distinguish one message from another, as no two message identifications could reasonably be confused. It should be understood that message identifications may be reused, but the range of available message identifications should be large enough that it is highly improbably that two messages would use the same message identification within the same time period.

In block 415, a talkgroup identifier may be computed based in part on the message identification. The computation should be such that no two message identifications would reasonably result in the same computed talkgroup identifier. As shown in block 420, in some implementations, a modulo operation is used to ensure that two different message identifications do not result in the same computed talkgroup identifier. Although a modulo operation is mentioned, it should be understood that any other algorithm that has similar properties (e.g. low likelihood that two different message identifications result in the same computed talkgroup identifier) would be suitable. What should also be understood is that both the controller and the server use the same algorithm to compute the same talkgroup identifier.

In some implementations, as shown in block 425, the talkgroup identifier is further computed based on the controller identification. In other words, the controller identification itself may play a role in computing the talkgroup identifier such that if two controllers receive the same message identification, each one will compute a different talkgroup identifier as the talkgroup identifier would be based in part on the controller identification.

In block 430, a radio associated with the controller (e.g. integrated with or communicatively coupled to the controller) may join a talkgroup associated with the talkgroup identifier. It should be understood that joining a talkgroup simply means the radio sets internal parameters to indicate that it will communicate on the talkgroup identified by the talkgroup identifier.

In block 435, a floor request may be sent via the radio on the talkgroup associated with the talkgroup identifier. The floor control request serves as an acknowledgement of receipt of the message. Because the talkgroup identifier is based on the message identification, the talkgroup selected will al so be based on the message identification. The floor request on the specific talkgroup is thus an acknowledgement of a specific message.

In block 440, a server may monitor the floor control request for the talkgroup associated with the talkgroup identifier. As explained above, the server calculates the talkgroup identifier using the same algorithm as the controller using the same inputs (e.g. message identification, etc.). As such, the server knows on which talkgroup to expect an acknowledgement for a specific message.

In block 445, a radio identifier of the radio that sent the floor control request is extracted. The radio identifier is associated with the controller. In other words, the controller receives the message and instructs the radio to send a floor control request. The floor control request includes the identifier of the radio, which in turn identifies the controller. The terms radio identifier and controller identifier may be used synonymously, and simply relates to the ability to identify the controller that received the message.

In block 450, it may be determined that the controller associated with the radio identifier acknowledged the message that required acknowledgement. This is because the message identification sent in the message resulted in the computation of a specific talkgroup identifier and the floor control request sent by the controller that received the message is on that same computed talkgroup. If the acknowledgement was for a different message identification, the floor control request would have arrived on a different talkgroup.

In some cases, after a period of time, no acknowledgement is received. In such cases, in block 455, the group text may be resent to at least one controller that has been determined to not have acknowledged the message that required acknowledgement. In some cases, the message may be resent to only those controllers that have not acknowledged the message.

Figure 5:
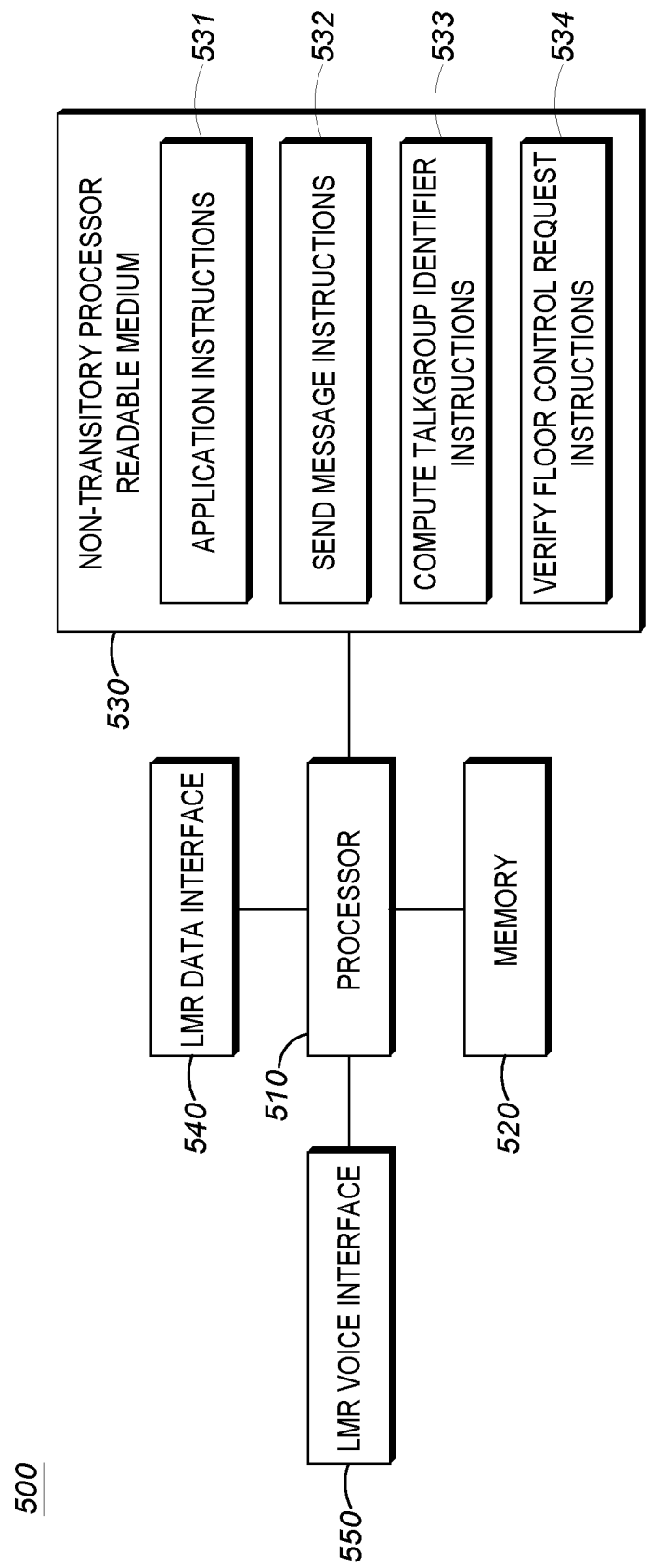
FIG. 5 is an example server that may implement the message acknowledgement when messaging system is unavailable techniques described herein.

FIG. 5 is an example server that may implement the message acknowledgement when messaging system is unavailable techniques described herein. It should be understood that FIG. 5 represents one example implementation of a computing device that utilizes the techniques described herein. Although only a single processor is shown, it would be readily understood that a person of skill in the art would recognize that distributed implementations are also possible. For example, the various pieces of functionality described above (e.g. video analytics, audio analytics, etc.) could be implemented on multiple devices that are communicatively coupled. FIG. 5 is not intended to imply that all the functionality described above must be implemented on a single device.

Device 500 may include processor 510, memory 520, non-transitory processor readable medium 530, LMR data interface 540, and LMR voice interface 550.

Processor 510 may be coupled to memory 520. Memory 520 may store a set of instructions that when executed by processor 510 cause processor 510 to implement the techniques described herein. Processor 510 may cause memory 520 to load a set of processor executable instructions from non-transitory processor readable medium 530. Non-transitory processor readable medium 530 may contain a set of instructions thereon that when executed by processor 510 cause the processor to implement the various techniques described herein.

For example, medium 530 may include application instructions 531. The application instructions may cause server 500 to implement an application that sends messages that require acknowledgement. One example, of such application presented herein is a siren control application. However, this is only an example of an application, and the techniques described herein are not limited to any particular type of application.

Medium 530 may include send message instructions 532 to send messages that require acknowledgement to a controller. In normal operation, send message instructions 532 may utilize the LMR data interface 540 to send two way messages to the controller via the LMR data system. Thus, a message requiring acknowledgement could be acknowledged over the LMR data interface. However, for purposes of this disclosure, the LMR data system is unavailable.

Instead, send message instructions 532 may utilize the LMR voice interface to send a group message to the controller via the LMR voice system. As explained throughout the disclosure, the LMR voice system is capable of sending one way messages to controllers, but is not capable of receiving return messages as acknowledgements. Send message instructions generally corresponds to steps 302 and 304 of FIG. 3.

Medium 530 may include compute talkgroup identifier instructions 533. The compute talkgroup identifier instructions 533 may cause the processor to compute a talkgroup identifier based on at least the message identifier. Compute talkgroup identifier instructions generally correspond to FIG. 2, step 306A of FIG. 3, and block 440 of FIG. 4.

Medium 530 may include verify floor control request instructions 534. Verify floor control request instructions 534 may allow the processor to monitor floor control requests on the computed talkgroup to determine if the controller to which the message was sent has acknowledged receipt of the message by requesting the floor on the computed talkgroup. Verify floor control request instructions 534 generally correspond to FIG. 3, steps 310-316, and blocks 445-455 of FIG. 4.

Figure 6:
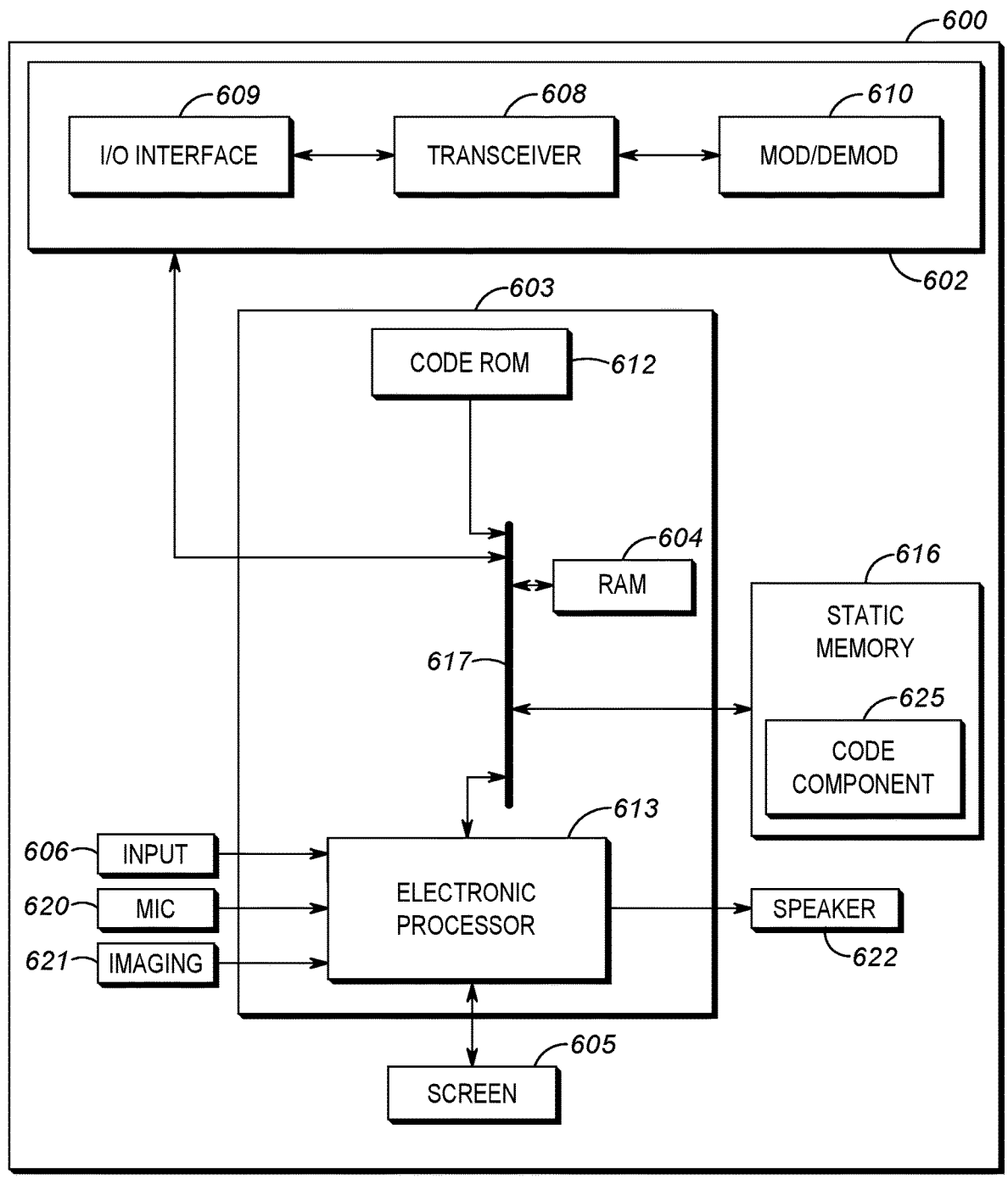
FIG. 6 is an example controller that may implement the message acknowledgement when messaging system is unavailable techniques described herein.

FIG. 6 is an example controller 600 that may implement the message acknowledgement when messaging system is unavailable techniques described herein. The communication device 600 may be, for example, embodied in the controller 160 and LMR Radio 165 described in FIG. 1 and/or may be a distributed communication device across two or more of the foregoing (or multiple of a same type of one of the foregoing) and linked via a wired and/or wireless communication link(s). In some embodiments, the communication device 600 (for example, the controller 160) may be communicatively coupled to other devices such as the controller 160 as described above. In such embodiments, the combination of the LMR radio 165 and the controller 160 may be considered a single controller 600.

While FIG. 6 represents the communication devices described above with respect to FIG. 1, depending on the type of the communication device, the communication device 600 may include fewer or additional components in configurations different from that illustrated in FIG. 6. For example, in some embodiments, communication device 600 acting as the controller 160 may not include one or more of the screen 605, input device 606, microphone 620, imaging device 621, and speaker 622. As another example, in some embodiments, the communication device 600 acting as the controller 160 may further include connections to external devices (not shown) such as a siren 170. Other combinations are possible as well.

As shown in FIG. 6, communication device 600 includes a communications unit 602 coupled to a common data and address bus 617 of a processing unit 603. The communication device 600 may also include one or more input devices (e.g., keypad, pointing device, touch-sensitive surface, etc.) 606 and an electronic display screen 605 (which, in some embodiments, may be a touch screen and thus also act as an input device 606), each coupled to be in communication with the processing unit 603.

The microphone 620 may be present for capturing audio from a user and/or other environmental or background audio that is further processed by processing unit 603 in accordance with the remainder of this disclosure and/or is transmitted as voice or audio stream data, or as acoustical environment indications, by communications unit 602 to other portable radios and/or other communication devices. The imaging device 621 may provide video (still or moving images) of an area in a field of view of the communication device 600 for further processing by the processing unit 603 and/or for further transmission by the communications unit 602. A speaker 622 may be present for reproducing audio that is decoded from voice or audio streams of calls received via the communications unit 602 from other portable radios, from digital audio stored at the communication device 600, from other ad-hoc or direct mode devices, and/or from an infrastructure RAN device, or may playback alert tones or other types of pre-recorded audio.

The processing unit 603 may include a code Read Only Memory (ROM) 612 coupled to the common data and address bus 617 for storing data for initializing system components. The processing unit 603 may further include an electronic processor 613 (for example, a microprocessor or another electronic device) coupled, by the common data and address bus 617, to a Random Access Memory (RAM) 604 and a static memory 616.

The communications unit 602 may include one or more wired and/or wireless input/output (I/O) interfaces 609 that are configurable to communicate with other communication devices, such as the LMR integrated voice and data system 140.

For example, the communications unit 602 may include one or more wireless transceivers 608, such as a DMR transceiver, a P25 transceiver, a Bluetooth transceiver, a Wi-Fi transceiver perhaps operating in accordance with an IEEE 802.11 standard (e.g., 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network.

The electronic processor 613 has ports for coupling to the display screen 605, the input device 606, the microphone 620, the imaging device 621, and/or the speaker 622. Static memory 616 may store operating code 625 for the electronic processor 613 that, when executed, performs one or more of the steps set forth in FIGS. 1-4 and accompanying text.

In some embodiments, static memory 616 may store, permanently or temporarily, instructions to implement the functionality described above. For example, static memory 616 may include instructions that generally correspond to instructions that cause the processor to implement the functionality described in steps 304-308 of FIG. 3 and blocks 405-435 of FIG. 4.

a threshold level mapping indicating numerical ranges at which auditory output generated by the electronic digital assistant may be lengthened and/or shortened, a database of acronyms and their associated full terms for use in transitioning between one or the other based on a detected acoustic environment, a thesaurus database of words having similar meanings and including a syllable count for use in transitioning between them based on a detected acoustic environment, a 10-code database including the 10-code and the 10-codes associated full term meaning for use in transitioning between one or the other based on a detected acoustic environment, a contraction database setting forth contractions and the words they stand for use in transitioning between one or the other based on a detected acoustic environment, and an abbreviation database including the abbreviation and the full word that the abbreviation abbreviates for use in transitioning between one or the other based on a detected acoustic environment.

The static memory 616 may comprise, for example, a hard-disk drive (HDD), an optical disk drive such as a compact disk (CD) drive or digital versatile disk (DVD) drive, a solid state drive (SSD), a flash memory drive, or a tape drive, and the like.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot [include a particular function/feature from current spec], among other features and functions set forth herein).

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having,"

"includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method comprising:
   receiving, at a controller, a group text including a message that requires acknowledgement, wherein the group text is directed to at least one controller;
   extracting a message identification from the message, the message identification associated with the message that requires acknowledgement;
   computing a talkgroup identifier based in part on the message identification;
   joining, by a radio associated with the controller, a talkgroup associated with the talkgroup identifier; and
   sending a floor control request via the radio on the talkgroup associated with the talkgroup identifier, wherein the floor control request serves as an acknowledgement of receipt of the message.

2. The method of claim 1 wherein computing the talkgroup identifier further comprises:
   computing the talkgroup identifier further based in part on the controller identification.

3. The method of claim 1 wherein the controller is a siren controller and the message requiring acknowledgement is a siren activation command.

4. The method of claim 1 wherein the talkgroup identifier is computed using a modulo operator.

5. The method of claim 1 further comprising:
monitoring, by a server, the floor control request for the talkgroup associated with the talkgroup identifier;
extracting a radio identifier of the radio that sent the floor control request, wherein the radio identifier is associated with the controller; and
determining that the controller associated with the radio identifier has acknowledged the message that required acknowledgement.

6. The method of claim 5 further comprising:
resending the group text to at least one controller that has been determined to not have acknowledged the message that required acknowledgement.

7. The method of claim 1 wherein the floor control request is a push to talk (PTT) request on a land mobile radio (LMR) network.

8. A system comprising:
a processor; and
a memory coupled to the processor containing a set of instructions thereon that when executed by the processor cause the processor to:
receive, at a controller, a group text including a message that requires acknowledgement, wherein the group text is directed to at least one controller;
extract a message identification from the message, the message identification associated with the message that requires acknowledgement;
compute a talkgroup identifier based in part on the message identification;
join, by a radio associated with the controller, a talkgroup associated with the talkgroup identifier; and
send a floor control request via the radio on the talkgroup associated with the talkgroup identifier, wherein the floor control request serves as an acknowledgement of receipt of the message.

9. The system of claim 8 wherein computing the talkgroup identifier further comprises instructions to:
compute the talkgroup identifier further based in part on the controller identification.

10. The system of claim 8 wherein the controller is a siren controller and the message requiring acknowledgement is a siren activation command.

11. The system of claim 8 wherein the talkgroup identifier is computed using a modulo operator.

12. The system of claim 8 further comprising instructions to:
monitor, by a server, the floor control request for the talkgroup associated with the talkgroup identifier;
extract a radio identifier of the radio that sent the floor control request, wherein the radio identifier is associated with the controller; and
determine that the controller associated with the radio identifier has acknowledged the message that required acknowledgement.

13. The system of claim 12 further comprising instructions to:
resend the group text to at least one controller that has been determined to not have acknowledged the message that required acknowledgement.

14. The system of claim 8 wherein the floor control request is a push to talk (PTT) request on a land mobile radio (LMR) network.

15. A non-transitory processor readable medium containing a set of instructions thereon that when executed by a processor cause the processor to:
receive, at a controller, a group text including a message that requires acknowledgement, wherein the group text is directed to at least one controller;
extract a message identification from the message, the message identification associated with the message that requires acknowledgement;
compute a talkgroup identifier based in part on the message identification;
join, by a radio associated with the controller, a talkgroup associated with the talkgroup identifier; and
send a floor control request via the radio on the talkgroup associated with the talkgroup identifier, wherein the floor control request serves as an acknowledgement of receipt of the message.

16. The medium of claim 15 wherein computing the talkgroup identifier further comprises instructions to:
compute the talkgroup identifier further based in part on the controller identification.

17. The medium of claim 15 wherein the controller is a siren controller and the message requiring acknowledgement is a siren activation command.

18. The medium of claim 15 wherein the talkgroup identifier is computed using a modulo operator.

19. The medium of claim 15 further comprising instructions to:
monitor, by a server, the floor control request for the talkgroup associated with the talkgroup identifier;
extract a radio identifier of the radio that sent the floor control request, wherein the radio identifier is associated with the controller; and
determine that the controller associated with the radio identifier has acknowledged the message that required acknowledgement.

20. The medium of claim 19 further comprising instructions to:
resend the group text to at least one controller that has been determined to not have acknowledged the message that required acknowledgement.

* * * * *